United States Patent
Takatama et al.

(10) Patent No.: US 7,100,166 B2
(45) Date of Patent: Aug. 29, 2006

(54) NETWORK APPLICATION DECENTRALIZED EXECUTION SYSTEM, TERMINAL EQUIPMENT AND NETWORK APPLICATION EXECUTION METHOD THEREFOR, AND OPERATION METHOD FOR TERMINAL EQUIPMENT

(75) Inventors: Hirokazu Takatama, Tokyo (JP); Hideaki Tani, Tokyo (JP)

(73) Assignee: NEC Corporation, Tokyo (JP)

( * ) Notice: Subject to any disclaimer, the term of this patent is extended or adjusted under 35 U.S.C. 154(b) by 582 days.

(21) Appl. No.: 10/078,505

(22) Filed: Feb. 21, 2002

(65) Prior Publication Data

US 2002/0116546 A1    Aug. 22, 2002

(30) Foreign Application Priority Data

Feb. 22, 2001  (JP) .............................. 2001-046356

(51) Int. Cl.
    *G06F 9/46*    (2006.01)
(52) U.S. Cl. ....................... 719/318; 709/220; 709/224
(58) Field of Classification Search ................ 719/310, 719/318; 709/200, 205, 208, 220, 224, 227
    See application file for complete search history.

(56) References Cited

U.S. PATENT DOCUMENTS

| | | | | |
|---|---|---|---|---|
| 5,911,066 A | * | 6/1999 | Williams et al. | 719/310 |
| 6,115,744 A | * | 9/2000 | Robins et al. | 709/227 |
| 6,272,673 B1 | * | 8/2001 | Dale et al. | 717/100 |
| 6,374,357 B1 | * | 4/2002 | Mohammed et al. | 713/201 |
| 6,772,205 B1 | * | 8/2004 | Lavian et al. | 709/223 |
| 6,785,659 B1 | * | 8/2004 | Landsman et al. | 705/14 |
| 6,832,380 B1 | * | 12/2004 | Lau et al. | 719/328 |
| 2001/0038624 A1 | * | 11/2001 | Greenberg et al. | 370/352 |

FOREIGN PATENT DOCUMENTS

JP        11-239094        8/1999

OTHER PUBLICATIONS

Lennox, J. et al., "Call Processing Language Framework and Requirements, RFC 2824" RFC 2824, May 1, 2000, XP015008607.
Rizzeto, D. et al., "A Voice over IP Service Architecture for Integrated Communications" IEEE, May 1, 1999, XP002302476 HP LABORATORIES.
Yates, M.J. et al., "The Parlay Network API Specification" BT Technology Journal, BT Laboratories, GB, vol. 18, No. 2, Apr. 2000, pp. 57-64, XP000958413.
3GPP: "Mobile Execution Environment (MExE)" 3GPP Technical Specification TS 22057, Oct. 1, 2000, XP002302475 3GPP, 3RD Generation Partnership Project.

* cited by examiner

*Primary Examiner*—William Thomson
*Assistant Examiner*—Andy Ho
(74) *Attorney, Agent, or Firm*—Young & Thompson

(57) ABSTRACT

A network application decentralized execution system which allows a network application developed for a centralized switched network to be applied to a decentralized switched network is disclosed. The network application decentralized execution system includes a network application server, a first terminal equipment and a second terminal equipment. Each of the first and second terminal equipments includes a detection section for detecting a variation of a connection state of the terminal equipment, a control section for controlling the connection state, and a plug-in section for plugging in an application execution script downloaded from a network application server.

64 Claims, 7 Drawing Sheets

NETWORK APPLICATION DECENTRALIZED EXECUTION SYSTEM, TERMINAL EQUIPMENT AND NETWORK APPLICATION EXECUTION METHOD THEREFOR, AND OPERATION METHOD FOR TERMINAL EQUIPMENT

BACKGROUND OF THE INVENTION

1. Field of the Invention

The present invention relates to a network application decentralized execution system wherein a network application developed for a centralized switched network can be applied to a decentralized switched network.

2. Description of the Related Art

A system which provides an application programming interface (API) which abstracts and utilizes network controlling functions of a switching system is called open API of a network and serves as a platform for providing network service applications which make use of intra-network communication resources such as a switched network, a media storage and synthesis trunk and a multi-point conference control trunk.

Recently, such corporate bodies as the JAIN and the Parlay which standardize a set of such APIs as mentioned above have been organized, and a network application developed based on an API standardized by any of such corporate bodies can be utilized commonly between various switching systems of different implementation forms for which the API is ready. Thus, such network applications are generally useful for reduction of the period of development of a network application.

An interface between execution environments of an application described in an existing network API such as the JAIN or the Parlay and a switching system is conventionally implemented by connection between a server which executes the application and a control apparatus in an exchange. This makes it possible to perform detection of an event and a controlling operation from the application in response to a connection call managed in the control apparatus in the exchange.

The API set includes seven APIs given below in accordance with individual functions:

1. Event collection type API
2. State collection type API
3. Connection destination control type API
4. User interaction type API
5. Database accessing type API
6. Process calling type API
7. Process ending type API A network application can be constructed by a suitable combination of the APIs given above.

Meanwhile, a voice over Internet protocol (VoIP) network which is a switching service network in which the Internet protocol is used has been constructed recently, and the architecture for switched network control has begun to vary fundamentally.

In the VoIP network, each terminal equipment has a call state holding function and a mutual connection function incorporated therein so that it can establish a connection directly to another terminal equipment of the other party without intervention of an exchange using connection destination address information acquired from a directory server.

Such decentralized connection control as just described can significantly reduce the load to a server necessary for a switching network service.

However, a function module corresponding to the control apparatus of an exchange which is a destination of connection of a network application described above is decentralized and eliminated. In particular, communication in decentralized connection control is performed without intervention of an exchange, and therefore, application execution environments (refer to description hereinafter given with reference to FIG. 7) cannot control communication. Therefore, there is a problem that a network application developed for a centralized switched network cannot be applied to a decentralized switched network.

SUMMARY OF THE INVENTION

It is an object of the present invention to provide a network application decentralized execution system which allows a network application developed for a centralized switched network to be applied to a decentralized switched network.

In order to attain the object described above, according to an aspect of the present invention, there is provided a network application decentralized execution system which allows application of a network application developed for a concentrated switched network to a decentralized switched network, comprising a network application server, and a terminal equipment including connection state variation detection means for detecting a variation of a connection state of the terminal equipment, connection state control means for controlling the connection state of the terminal equipment, and plug-in means for plugging in an application execution script downloaded from the network application server.

Preferably, the network application decentralized execution system further comprises a database, and wherein the plug-in means records time for which the application execution script is executed into the database.

According to another aspect of the present invention, there is provided a network application decentralized execution system which allows application of a network application developed for a concentrated switched network to a decentralized switched network, comprising a network application server, and a terminal equipment, the network application server including an application storage section for storing an application execution script for a concentrated switched network, a subscriber information storage section for storing corresponding relationships between subscribers and network applications used by the subscribers, a subscriber/application information management section for managing the application storage section and the subscriber information storage section, and a data transmission/reception section for exchanging data with the terminal equipment, the terminal equipment including an application storage section for storing the application execution script downloaded from the network application server, an application control section for executing a network application and managing the application storage section, a state variation detection section for supervising an event designated by the network application and issuing, if the event occurs, a notification of the occurrence of the event to the application control section, a call state storage section for storing a call state of the terminal equipment and another terminal equipment of the other party of the communication, a connection state control section for managing the call state storage section, and a data transmission/reception section for exchanging data with the terminal equipment of the other party and the network application server.

According to a further aspect of the present invention, there is provided a network application decentralized execution system which allows application of a network application developed for a concentrated switched network to a decentralized switched network, comprising a network application server, a terminal equipment, and a database connected to the terminal equipment, the network application server including an application storage section for storing an application execution script for a concentrated switched network, a subscriber information storage section for storing corresponding relationships between subscribers and network applications used by the subscribers, a subscriber/application information management section for managing the application storage section and the subscriber information storage section, and a data transmission/reception section for exchanging data with the terminal equipment, the terminal equipment including an application storage section for storing the application execution script downloaded from the network application server, an application control section for executing a network application and managing the application storage section, a state variation detection section for supervising an event designated by the network application and issuing, if the event occurs, a notification of the occurrence of the event to the application control section, a call state storage section for storing a call state of the terminal equipment and another terminal equipment of the other party of the communication, a connection state control section for managing the call state storage section, and a data transmission/reception section for exchanging data with the terminal equipment of the other party and the network application server, the database being connected to the data transmission/reception section of the terminal equipment.

In the network application decentralized execution systems according to the second and third aspects of the present invention, the application control section may include and use an application programming interface for a concentrated switched network to control the call state storage section and the connection state control section.

The application control section may have, as a function of the application programming interface, (1) a function of detecting an event and issuing a notification of the occurrence of the event to the application execution script;

(2) a function of causing the application execution script to place the terminal equipment into a connection state and a communication state;

(3) a function of causing the application execution script to control the connection state of the terminal equipment;

(4) a function of causing the application execution script to interact with a user through the terminal equipment;

(5) a function of causing the application execution script to access the network application server;

(6) a function of causing the application execution script to call a process of a concentrated server; or (7) a function of ending an execution state of the application execution script.

In the network application decentralized execution system according to the third aspect of the present invention, the application control section may write a period of time within which the application execution script is executed into the database.

According to a still further aspect of the present invention, there is provided a terminal equipment which cooperates with a network application server to form a network application decentralized execution system which allows application of a network application developed for a concentrated switched network to a decentralized switched network, comprising connection state variation detection means for detecting a variation of a connection state of the terminal equipment, connection state control means for controlling the connection state of the terminal equipment, and plug-in means for plugging in an application execution script downloaded from the network application server.

According to a yet further aspect of the present invention, there is provided a terminal equipment which cooperates with a network application server to form a network application decentralized execution system which allows application of a network application developed for a concentrated switched network to a decentralized switched network, comprising an application storage section for storing the application execution script downloaded from the network application server, an application control section for executing a network application and managing the application storage section, a state variation detection section for supervising an event designated by the network application and issuing, if the event occurs, a notification of the occurrence of the event to the application control section, a call state storage section for storing a call state of the terminal equipment and another terminal equipment of the other party of the communication, a connection state control section for managing the call state storage section, and a data transmission/reception section for exchanging data with the terminal equipment of the other party and the network application server.

According to a yet further aspect of the present invention, there is provided a terminal equipment which cooperates with a network application server and a database to form a network application decentralized execution system which allows application of a network application developed for a concentrated switched network to a decentralized switched network, comprising an application storage section for storing the application execution script downloaded from the network application server, an application control section for executing a network application and managing the application storage section, a state variation detection section for supervising an event designated by the network application and issuing, if the event occurs, a notification of the occurrence of the event to the application control section, a call state storage section for storing a call state of the terminal equipment and another terminal equipment of the other party of the communication, a connection state control section for managing the call state storage section, and a data transmission/reception section connected to the database for exchanging data with the terminal equipment of the other party and the network application server.

According to a yet further aspect of the present invention, there is provided an execution method of a network application for a network application decentralized execution system which includes a network application server and a terminal equipment and allows application of a network application developed for a concentrated switched network to a decentralized switched network, comprising a first step of detecting a variation of a connection state between the network application server and the terminal equipment, a second step of controlling the connection state in response to the variation detected by the first step, and a third step of for plugging in an application execution script downloaded from the network application server.

Preferably, the execution method further comprises a step of recording time for which the application execution script is executed.

According to a yet further aspect of the present invention, there is provided an execution method of a network application for a network application decentralized execution system which includes a network application server and a terminal equipment and allows application of a network application developed for a concentrated switched network to a decentralized switched network, comprising a first step of downloading a network application from the network application server into the terminal equipment, a second step of setting a first trigger for starting up the received network application to the terminal equipment, a third step of starting up the network application when the first trigger is fired, and a fourth step of ending the execution of the network application when a particular operation is performed.

Preferably, the execution method further comprises a step of setting a second trigger for starting up a next operation when the first trigger is fired.

Preferably, the execution method further comprises a step of setting an N+1th trigger for starting up a next operation when an Nth trigger is fired, N being a positive integer greater than 1.

The first step may include the steps of using, when power supply to the terminal equipment is switched on, the switching on of the power supply as a trigger to start up a network application for allowing selection from among services which can be used by the terminal equipment, transmitting subscriber identification information from the terminal equipment to the network application server, preparing a list of network applications which can be used by a user of the terminal equipment based on the subscriber identification information by the network application server and transmitting the list from the network application server to the terminal equipment, selecting one of the network applications from within the list by the user of the terminal equipment, and downloading the selected network application from the network application server to the terminal equipment.

Preferably, the execution method further comprises a step of storing the network application downloaded from the network application server into the terminal equipment.

Preferably, the execution method further comprises a step of issuing, when the first trigger is fired, before the network application is started up, an inquiry from the terminal equipment to a user of the terminal equipment regarding whether or not the network application may be started up.

Preferably, execution method further comprises a step of issuing, when the first trigger is fired, before the network application is started up, an inquiry from the terminal equipment to a user of the terminal equipment regarding whether or not the network application may be started up, and the second trigger or the second to N+1th triggers are set only when the user consents to starting up of the network application.

Preferably, the execution method further comprises a step of recording time for which the network application is executed.

According to a yet further aspect of the present invention, there is provided an operation method for a terminal equipment which cooperates with a network application server to form a network application decentralized execution system which allows application of a network application developed for a concentrated switched network to a decentralized switched network, comprising a first step of detecting a variation of a connection state between the terminal equipment and the network application server, a second step of controlling the connection state in response to the variation detected by the first step, and a third step of plugging in an application execution script downloaded from the network application server.

Preferably, the operation method further comprises a step of recording time for which the application execution script is executed.

According to a yet further aspect of the present invention, there is provided an operation method for a terminal equipment which cooperates with a network application server to form a network application decentralized execution system which allows application of a network application developed for a concentrated switched network to a decentralized switched network, comprising a first step of downloading a network application from the network application server into the terminal equipment, a second step of setting a first trigger for starting up the received network application to the terminal equipment, a third step of starting up the network application when the first trigger is fired, and a fourth step of ending the execution of the network application when a desired operation is performed.

Preferably, the operation method further comprises a step of setting a second trigger for starting up a next operation when the first trigger is fired.

Preferably, the operation method further comprises a step of setting an N+1th trigger for starting up a next operation when an Nth trigger is fired, N being a positive integer greater than 1.

The first step may include the steps executed by the terminal equipment of using, when power supply to the terminal equipment is switched on, the switching on of the power supply as a trigger to start up a network application for allowing selection from among services which can be used by the terminal equipment, transmitting subscriber identification information to the network application server, receiving a list of network applications which can be used by a user of the terminal equipment prepared based on the subscriber identification information by and transmitted from the network application server, and downloading one of the network applications of the list selected by a user of the terminal equipment from the network application server.

Preferably, the operation method further comprises a step of storing the network application downloaded from the network application server into the terminal equipment.

Preferably, the operation method comprises a step of issuing, when the first trigger is fired, before the network application is started up, an inquiry to a user of the terminal equipment regarding whether or not the network application may be started up.

Preferably, the operation method further comprises a step of issuing, when the first trigger is fired, before the network application is started up, an inquiry from the terminal equipment to a user of the terminal equipment regarding whether or not the network application may be started up, and the second trigger or the second to N+1th triggers are set only when the user consents to starting up of the network application.

Preferably, the operation method further comprises a step of recording time for which the network application is executed.

As described above, according to the present invention, a network application decentralized execution system which includes a network application server and a terminal equipment and allows application of a network application developed for a concentrated switched network to a decentralized switched network is configured such that the terminal equipment has extended functions.

More particularly, the terminal equipment has a function for detecting a variation of a connection state of the terminal equipment, another function for controlling the connection state of the terminal equipment, and a further plug-in function for plugging in an application execution script.

The application execution script is selected based on a subscriber contract or a connection destination number inputted upon origination of a call and is downloaded from a network application server on a network.

The APIs of the API set described hereinabove correspond to the functions of the terminal equipment as described below.

The event collection type API corresponds to the function of the application execution script of detecting an event and issuing a notification of the occurrence of the event to the application execution script.

The state collection type API corresponds to the function of the application execution script of acquiring a connection state, a terminal state and a communication state.

The connection destination control type API corresponds to the function of the application execution script of controlling the connection state of the terminal equipment.

The user interaction type API corresponds to the function of the application execution script of interacting with a user through the terminal equipment.

The database accessing type API corresponds to the function of the application execution script of accessing a database server.

The process calling type API corresponds to the function of the application execution script of calling a process of a concentrated server.

The process ending type API corresponds to the function of the application execution script of ending an execution state.

As described above, according to the present invention, a network application developed for a centralized switched network system can be executed on a decentralized switched network system, and consequently, effective utilization of the service application can be promoted while merits of a decentralized system are maintained.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

First, in order to facilitate understanding of the present invention, general configurations of a network application decentralized execution system according to the present invention and a network application execution system disclosed, for example, in Japanese Patent Laid-Open No. 239094/1999 as a representative one of conventional network application execution systems are described for comparison.

Figure 7:
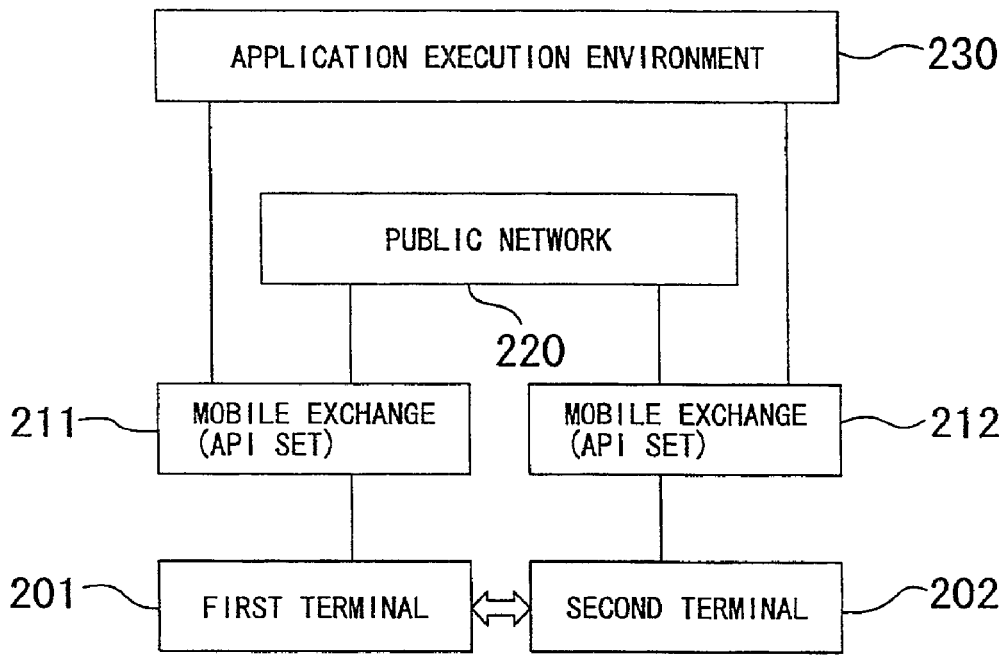
FIG. 7 is a block diagram showing a general configuration of a conventional network application execution system.

Referring first to FIG. 7, there is shown a configuration of the conventional network application execution system mentioned above. The network application execution system shown includes first and second terminal equipments 201 and 202, mobile exchanges 211 and 212 corresponding to the first and second terminal equipments 201 and 202, respectively, a public network 220 for interconnecting the mobile exchanges 211 and 212, and an application execution environment 230 connected to the mobile exchanges 211 and 212 for controlling the mobile exchanges 211 and 212 to provide added-value services to the terminal equipments 201 and 202.

Operation when, for example, the first terminal equipment 201 uses a certain application (for example, a number conversion application hereinafter described in connection with a second embodiment of the present invention) to communicate with the second terminal equipment 202 is such as follows.

If the mobile exchange 211 receives a call origination request from the first terminal equipment 201, then it notifies the application execution environment 230 of the call origination request. The application execution environment 230 performs number conversion of a connection destination and issues an instruction to the mobile exchange 211 to transfer the call origination request to the mobile exchange 212. As a result, the first terminal equipment 201 can start communication with the second terminal equipment 202 through the mobile exchange 211, public network 220 and mobile exchange 212.

In the conventional network application execution system, the API set is incorporated only in the mobile exchanges 211 and 212.

Accordingly, execution of the application between the first terminal equipment 201 and the second terminal equipment 202 must be performed through the mobile exchanges 211 and 212.

Figure 8:
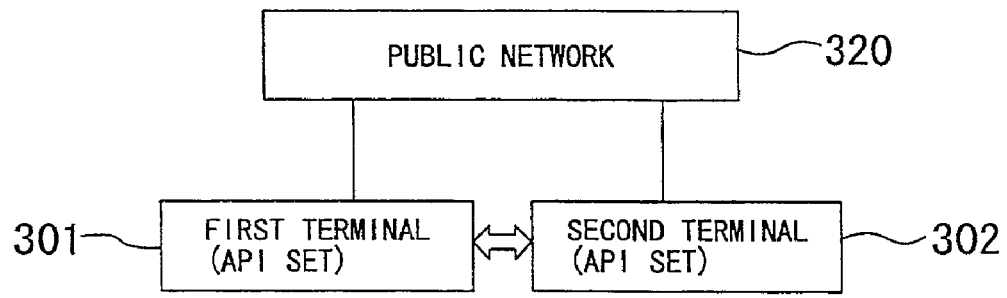
FIG. 8 is a block view showing a general configuration of a network application decentralized execution system according to the present invention.

FIG. 8 shows the network application decentralized execution system according to the present invention. Referring to FIG. 8, the network application decentralized execution system according to the present invention includes a plurality of terminal equipments 301 and 302, and a public network 320 for interconnecting the terminal equipments 301 and 302.

Different from the conventional network application execution system, the network application decentralized execution system according to the present invention does not include a mobile exchange in which the APIs described above are defined, but the APIs described above are defined in each of the terminal equipments 301 and 302 in advance. In other words, each of the terminal equipments 301 and 302 in the network application decentralized execution system according to the present invention has, in addition to functions as a terminal equipment, functions as the mobile exchanges 211 and 212 in the conventional network application execution system.

Therefore, for example, if an application is downloaded from an application server into the terminal equipments 301 and 302, then each of the terminal equipments 301 and 302 can execute the application directly between the terminal equipments 301 and 302 without intervention of a mobile exchange as is used in the conventional network application execution system.

Therefore, when compared with the conventional network application execution system, the network application decentralized execution system of the present invention can eliminate a mobile exchange itself and can therefore achieve simplification in system structure.

Figure 1:
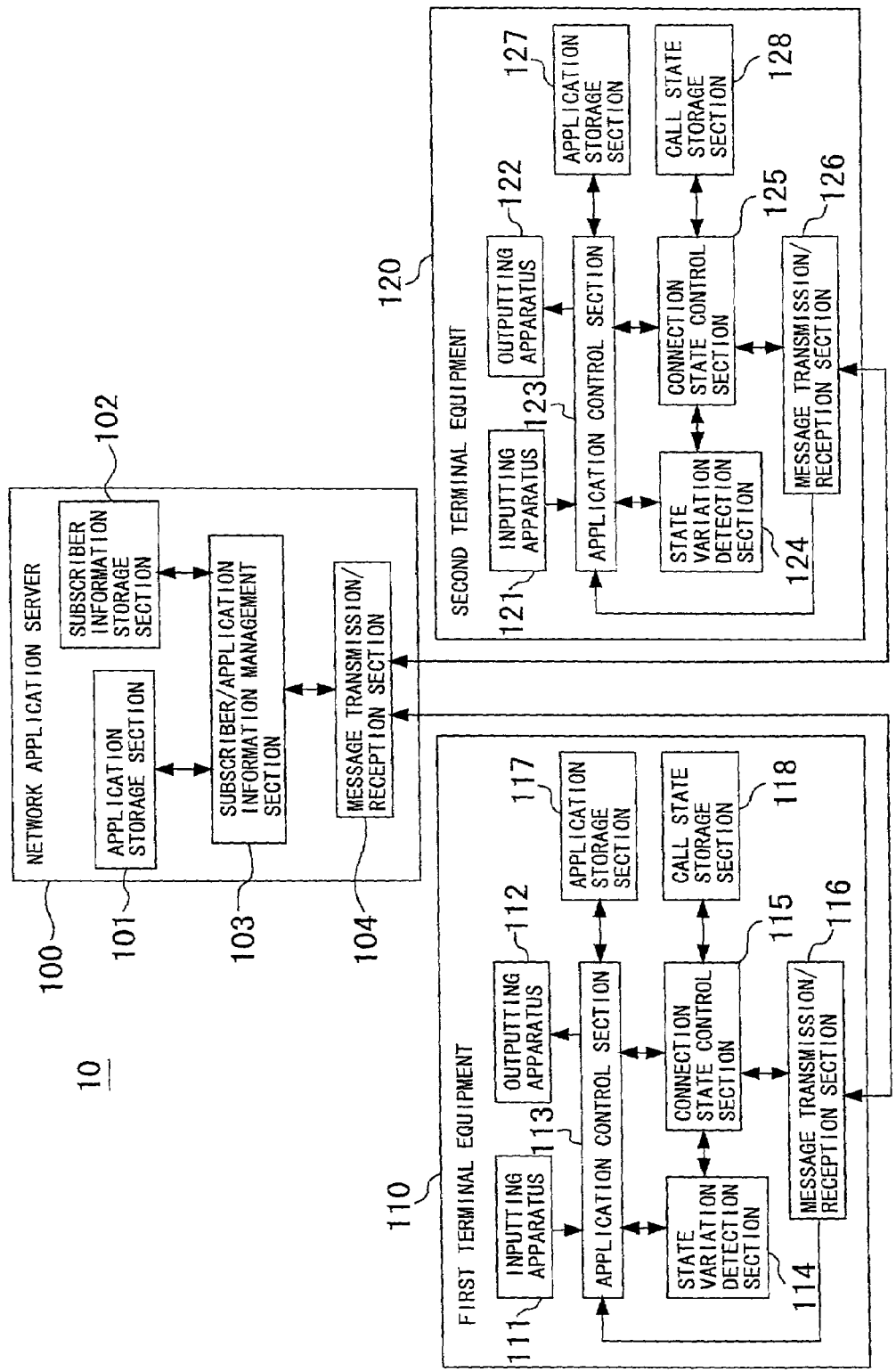
FIG. 1 is a block diagram showing a configuration of a network application decentralized execution system to which the present invention is applied.

Referring now to FIG. 1, there is shown a network application decentralized execution system to which the present invention is applied. The network application decentralized execution system of the present embodiment uses the event collection type API, state collection type API, connection destination control type API, user interaction type API, database accessing type API, process calling type API and process ending type API.

It is to be noted that, in the following description, the network application decentralized execution system of the present embodiment uses an automatic call back service application as an example of a network application. The automatic call back service signifies a service which is started up when a party of a call destination is busy and re-originates a telephone call automatically using it as a trigger that the telephone conversion of the party of the call destination comes to an end.

The network application decentralized execution system shown in FIG. 1 generally denoted by 10 and includes a network application server 100, a first terminal equipment 110 and a second terminal equipment 120.

The network application server 100 includes an application storage section 101, a subscriber information storage section 102, a subscriber/application information management section 103 and a message transmission/reception section 104.

The application storage section 101 stores a service application (application execution script). The application execution script stored in the application storage section 101 has originally been developed for a concentrated switched network.

The subscriber information storage section 102 stores corresponding relationships between subscribers and applications used by the individual subscribers.

The subscriber/application information management section 103 manages the application storage section 101 and the subscriber information storage section 102.

For example, the subscriber/application information management section 103 performs licensing management in order to allow a network application for carrying out a service requested by a subscriber to be downloaded into a terminal equipment of the subscriber in response to the request from the subscriber.

The message transmission/reception section 104 performs exchange of data such as a message with the first and second terminal equipments 110 and 120.

The first terminal equipment 110 includes an inputting apparatus 111, an outputting apparatus 112, an application control section 113, a state variation detection section 114, a connection state control section 115, a message transmission/reception section 116, an application storage section 117 and a call state storage section 118.

The inputting apparatus 111 may be formed, for example, as keys for inputting numerals and other symbols. However, for example, if the first terminal equipment 110 includes a liquid crystal display screen as the outputting apparatus 112, then the inputting apparatus 111 may be formed as a touch panel placed on the liquid crystal display screen. Alternatively, the inputting apparatus 111 may have, for example, a speech recognition function of a speaker so that it allows direct inputting of speech of a speaker.

The outputting apparatus 112 may include, for example, a liquid crystal display screen for displaying characters and symbols. The outputting apparatus 112 may further include a speaker for outputting a voice message.

The application control section 113 performs execution of a network application and management of the application storage section 117.

The state variation detection section 114 supervises an event designated by the network application and notifies the application control section 113 of occurrence of the event. The event occurs, for example, when connection of a call is completed, when the connection comes to an end, or when the position of a terminal equipment changes.

The connection state control section 115 performs management of the call state storage section 118, a transition process of a call state, a message preparation process involved in the transition process of a call state and other necessary processes. Further, if a connection state varies, then the connection state control section 115 notifies the state variation detection section 114 of the variation.

The message transmission/reception section 116 performs exchange of data such as a message with another terminal equipment and the network application server 100.

The application storage section 117 stores an application execution script downloaded from the network application server 100.

The call state storage section 118 stores call states of the terminal equipment itself and the opposite terminal equipment.

The application control section 113 controls not only the application storage section 117 but also the inputting apparatus 111, outputting apparatus 112, state variation detection section 114, connection state control section 115 and message transmission/reception section 116.

The application control section 113 includes an API set including the following APIs:
 1. Event collection type API
 2. State collection type API
 3. Connection destination control type API
 4. User interaction type API
 5. Database accessing type API
 6. Process calling type API
 7. Process ending type API The application control section 113 uses the API set to control the inputting apparatus 111, outputting apparatus 112, state variation detection section 114, connection state control section 115 and message transmission/reception section 116. The API set was originally developed so as to be used for development of network applications for a concentrated exchange. According to the present embodiment, however, the API set can be applied also to a decentralized switching network wherein functioning modules are decentralized (in the present embodiment, management of a call state is performed individually by the individual terminal equipments 110 and 120).

The second terminal equipment 120 includes an inputting apparatus 121, an outputting apparatus 122, an application control section 123, a state variation detection section 124, a connection state control section 125, a message transmission/reception section 126, an application storage section 127 and a call state storage section 128.

The inputting apparatus 121, outputting apparatus 122, application control section 123, state variation detection section 124, connection state control section 125, message transmission/reception section 126, application storage section 127 and call state storage section 128 have same configurations and functions as those of the inputting apparatus 111, outputting apparatus 112, application control section 113, state variation detection section 114, connection state control section 115, message transmission/reception section 116, application storage section 117 and call state storage section 118 of the first terminal equipment 110, respectively.

It is assumed that, in the present embodiment, the first terminal equipment 110 and the second terminal equipment 120 use an expanded protocol of the SIP (Session Initiation Protocol) as a signaling protocol for generation, modification or interruption of a call between terminals. The specifications of the SIP are recited in the RFC2543 used by the IETF (Internet Engineering Task Force). In the present embodiment, however, for simplified description, some message necessary for protocol operation is sometimes omitted.

Figure 2:
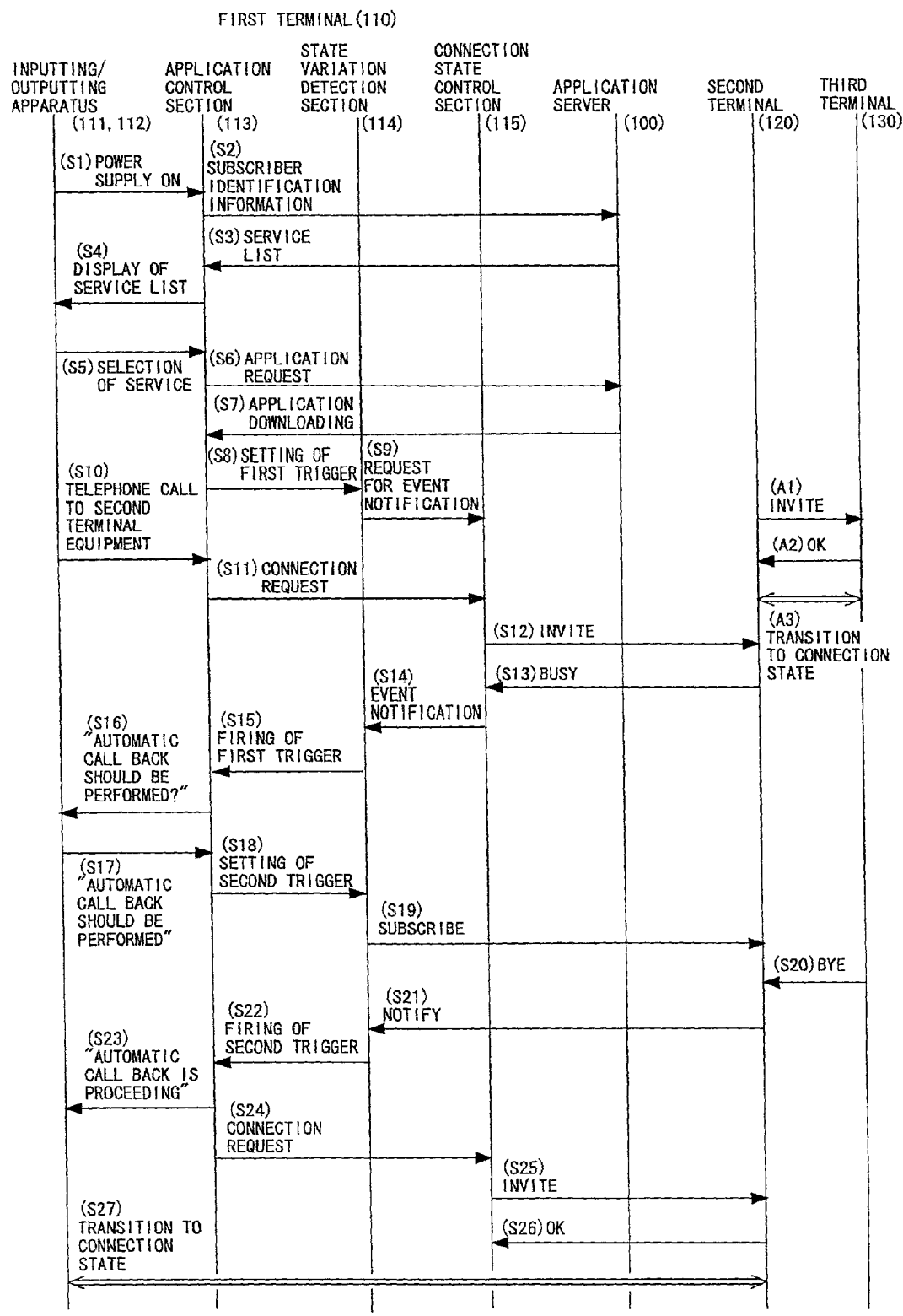
FIG. 2 is a flow chart illustrating operation of the network application decentralized execution system of FIG. 1.

FIG. 2 illustrates operation of the network application decentralized execution system 10 shown in FIG. 1. In the following, operation of the network application decentralized execution system 10 is described with reference to FIG. 2.

If a user of the first terminal equipment 110 operates the inputting apparatus 111 to switch on the power supply to the first terminal equipment 110 (step S1), then the application control section 113 of the first terminal equipment 110 uses it as a trigger to start up an application for selection of available services.

The application uses the process calling type API to acquire a list of services which can be used by each user who uses a terminal equipment from the network application server 100 in the following manner.

First, when the process calling type API is called, the application control section 113 of the first terminal equipment 110 transmits subscriber identification information of the user of the first terminal equipment 110 to the network application server 100 (step S2).

The network application server 100 receives the subscriber identification information, and prepares a list of services which can be used by the user of the first terminal equipment 110 based on the subscriber identification information and transmits the list to the first terminal equipment 110 (step S3).

The first terminal equipment 110 displays the received service list, for example, on the display screen of the outputting apparatus 112 (step S4).

The user of the first terminal equipment 110 will select a service to be used from among the services displayed on the display screen of the outputting apparatus 112 and designate the service through the inputting apparatus 111 (step S5).

In response to the designation of the service, the application control section 113 issues a request for downloading of a network application to be used for execution of the service selected by the user to the network application server 100 (step S6).

Then, the first terminal equipment 110 downloads the pertaining network application from the network application server 100 (step S7).

Here, the requesting for downloading of a network application to the network application server 100 (step S6) and the downloading of the network application from the network application server 100 (step S7) are realized by the application execution script using the database accessing type API.

The network application downloaded from the network application server 100 is sent to the application control section 113 through the message transmission/reception section 116.

The application control section 113 sets a first trigger for stating up the received network application to the state variation detection section 114 (step S8).

In the present embodiment, the first trigger for starting up the network application is set to "that the first terminal equipment 110 detects that the other party side terminal equipment is busy", that is, "that the first terminal equipment 110 receives a BUSY message from the other party side terminal equipment".

The setting of the first trigger is performed to the state variation detection section 114 by the application control section 113 using the event collection type API.

Further, since detection of an event is performed by the connection state control section 115, the state variation detection section 114 issues an instruction to the connection state control section 115 to notify the state variation detection section 114 of occurrence of the event when the event occurs.

Here, it is assumed that the user of the first terminal equipment 110 originates a telephone call to the second terminal equipment 120 (step S10).

First, if the user inputs a telephone number of a terminal equipment of the other party through the inputting apparatus 111, then the application control section 113 issues a connection request to the connection state control section 115 (step S11).

In response to the connection request, the connection state control section 115 transmits an INVITE message to the second terminal equipment 120 through the message transmission/reception section 116 (step S12).

Here, it is assumed that the second terminal equipment 120 is in a state connected to a third terminal equipment 130 when the first terminal equipment 110 issues a telephone call to the second terminal equipment 120 (steps A1, A2 and A3).

Therefore, the second terminal equipment 120 returns a BUSY message in response to the INVITE message originated from the first terminal equipment 110 (step S13).

When the first terminal equipment 110 receives the BUSY message from the second terminal equipment 120, the connection state control section 115 notifies the state variation detection section 114 in accordance with the instruction from the state variation detection section 114 to the connection state control section 115 set in step S9 that the designated event has occurred (step S14).

In response to the notification, the state variation detection section 114 fires the first trigger set in step S8. As a result, the automatic call back service application is started up.

At this time, a notification of the fact that the first trigger has been fired is sent from the state variation detection section 114 to the application control section 113 using the event collection type API (step S15).

Thereafter, the application control section 113 issues an inquiry whether or not the automatic call back service may be executed to the user of the first terminal equipment 110 through the outputting apparatus 112 before it starts the automatic call back service (step S16).

If the user of the first terminal equipment 110 consents with the inquiry (step S17), then the application control section 113 of the first terminal equipment 110 sets a second trigger necessary to start up a next operation (step S18).

Here, the inquiry of whether or not the automatic call back service may be executed to the user of the first terminal equipment 110 (step S16) and the reception of the consent of the user of the first terminal equipment 110 to the inquiry (step S17) are performed by the application control section 113 using the user interaction type API.

In the present embodiment, the second trigger is set to "that the second terminal equipment 120 is placed into a disconnected state". The setting of the second trigger is performed using the state collection type API.

In order to detect a state transition of the second terminal equipment 120 which is located remotely, the first terminal equipment 110 transmits to the second terminal equipment 120 a message (SUBSCRIBE) which designates that, when the second terminal equipment 120 is placed into a disconnected state, the second terminal equipment 120 should issue a notification of this to the first terminal equipment 110 (step S19).

If the second terminal equipment 120 receives a BYE message from the third terminal equipment 130 (step S20) and changes its state into a disconnected state, then it issues a message (NOTIFY) representing that it has been placed into a disconnected state to the state variation detection section 114 of the first terminal equipment 110 in accordance with the message (SUBSCRIBE) designated in step S19 (step S21).

When the first terminal equipment 110 receives the message from the second terminal equipment 120, the second trigger set in step S18 is fired (step S22), and the automatic call back service application executes a next instruction.

A notification that the second trigger has been fired is sent from the state variation detection section 114 to the application control section 113 using the state collection type API.

The application control section 113 issues a notification that the automatic call back process is proceeding to the user of the first terminal equipment 110 through the outputting apparatus 112 in accordance with the automatic call back service application.

Here, the notification that the automatic call back process is proceeding is carried out using the user interaction type API.

Then, the automatic call back service application issues an instruction to the connection state control section 115 of the first terminal equipment 110 to request the first terminal equipment 110 to connect itself to the second terminal equipment 120 (step S24). This request is carried out using the connection destination control type API.

In response to the request, the connection state control section 115 signals an INVITE message to the second terminal equipment 120 through the message transmission/reception section 116 (step S25).

If the user of the second terminal equipment 120 responds to the telephone call, then the second terminal equipment 120 transmits an OK message to the first terminal equipment 110 (step S26).

When the second terminal equipment 120 receives the OK message from the first terminal equipment 110, both of the first terminal equipment 110 and the second terminal equipment 120 enter a connection state (step S27) so that communication between the first terminal equipment 110 and the second terminal equipment 120 is enabled.

After the communication becomes enabled, the automatic call back service application uses the processing ending type API to end the execution state of the application execution script and abandon the control right to the call in the connected state.

Figure 3:
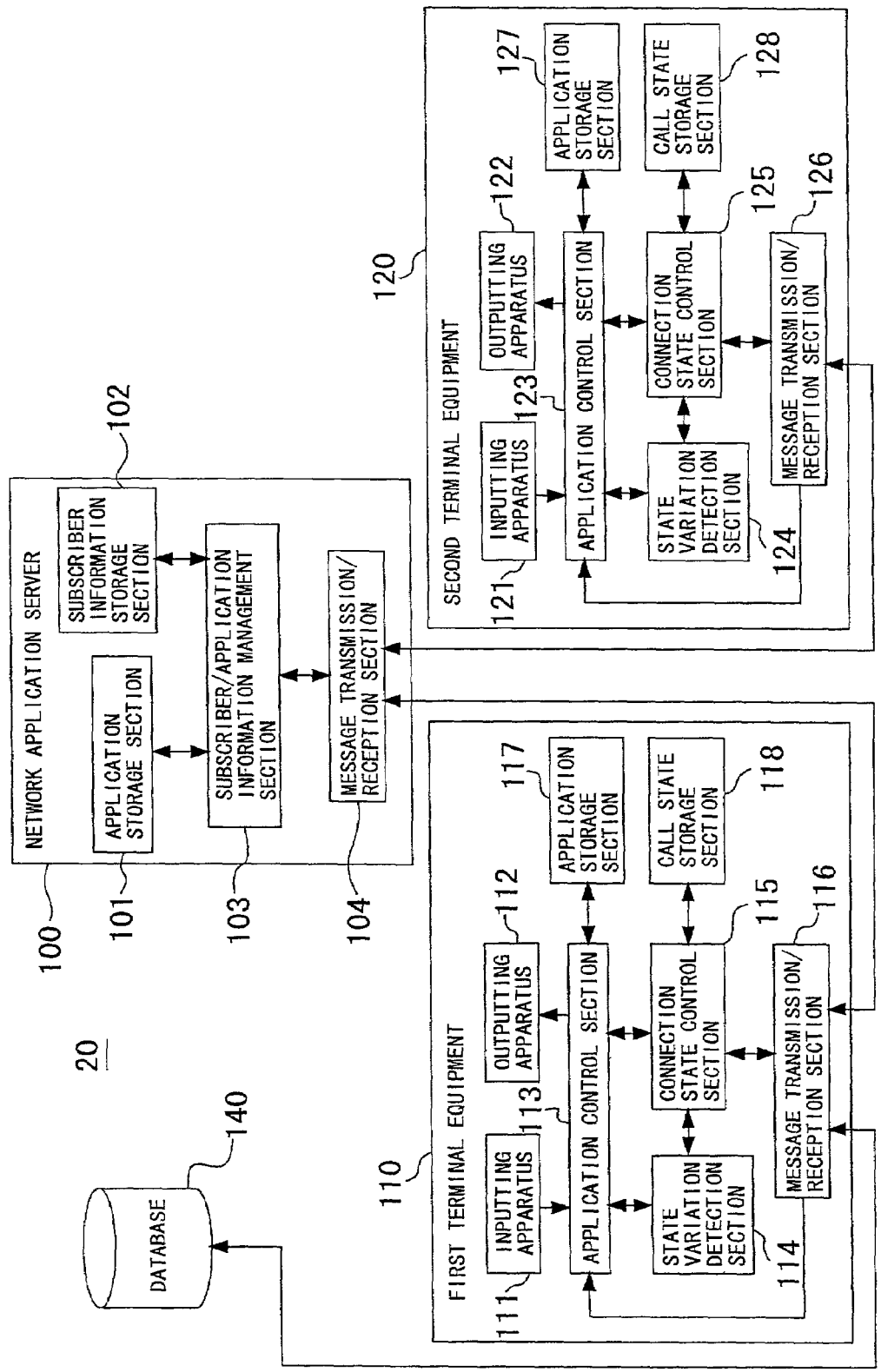
FIG. 3 is a block diagram showing a configuration of another network application decentralized execution system to which the present invention is applied.

FIG. 3 shows a configuration of another network application decentralized execution system to which the present invention is applied.

In the present embodiment, a number conversion application is used as an example of a network application. The number conversion application accesses, when a connection request to a connection destination address designated in advance is generated, a number conversion table to determine a transfer destination address from a connection source address and the connection destination address and transfers the telephone call. Use of the number conversion table makes it possible to automatically transfer, for example, only if a telephone call is originated to a rotary group number of a customer, the telephone call to an extension of the pertaining post of the customer.

It is assumed that, in the example described below, a period of time for which a telephone is connected is written into a database to grasp the connect time.

Referring to FIG. 3, the network application decentralized execution system 20 of the present embodiment is a modification to but is different from the network application decentralized execution system 10 of the first embodiment in that it additionally includes a database 140.

The database 140 is connected to the message transmission/reception section 116 of the first terminal equipment 110 and stores a number conversion table prepared in advance therein. Further, the database 140 records a communication period of time of the first terminal equipment 110.

Figure 4:
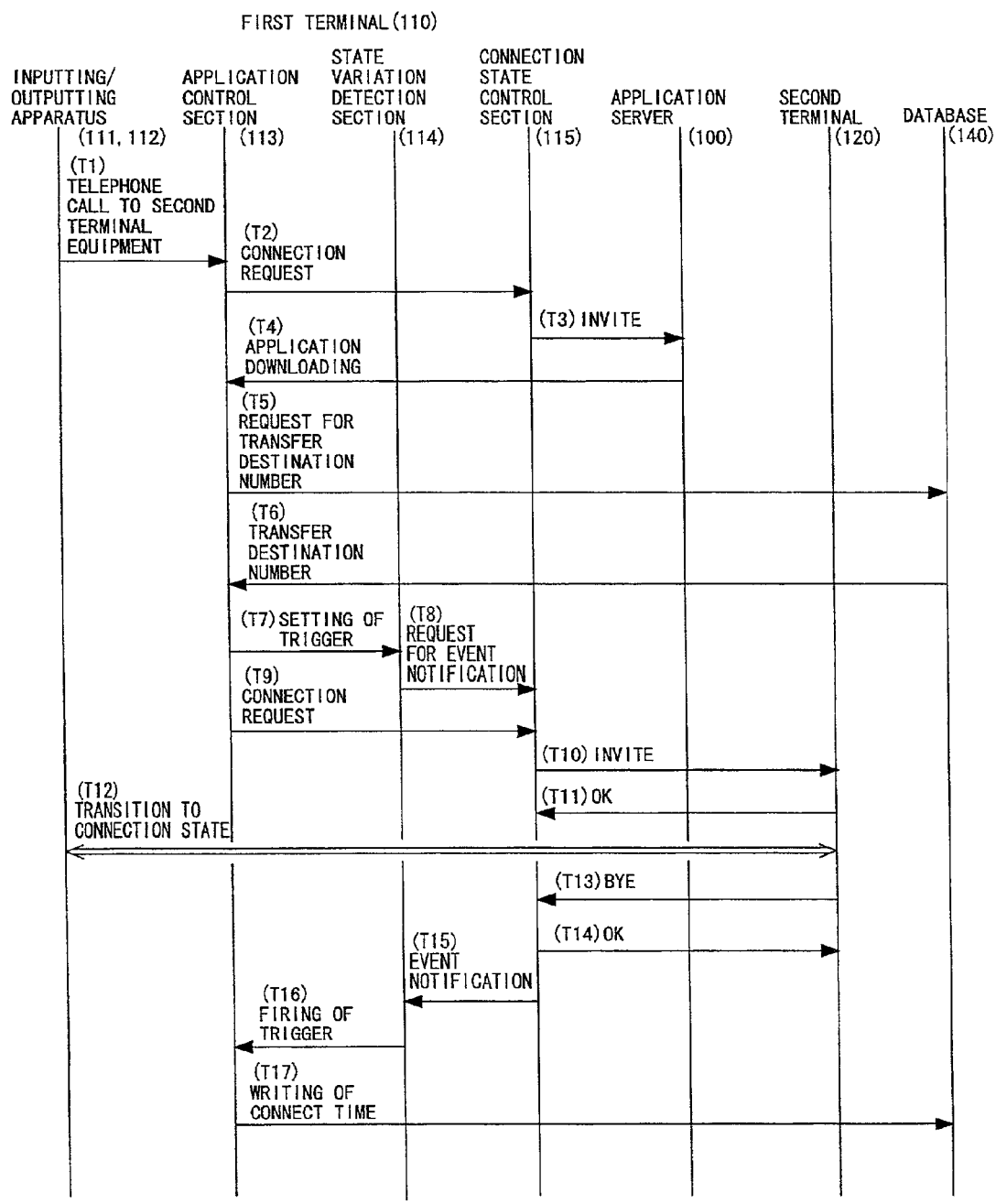
FIG. 4 is a flowchart illustrating operation of the network application decentralized execution system of FIG. 3.

FIG. 4 illustrates operation of the network application decentralized execution system 20 shown in FIG. 3. In the following, operation of the network application decentralized execution system 20 according to the present embodiment is described with reference to FIG. 4.

If a user of the first terminal equipment 110 issues a request to the application control section 113 to originate a telephone call to a certain address (for example, a rotary group number of a customer) through the inputting apparatus 111 (step T1), then the application control section 113 transmits the request to the connection state control section 115 (step T2).

Here, it is assumed that the network application server 100 is registered as a proxy server of the SIP (server which mediates SIP message exchange between terminals) in the first terminal equipment 110.

In response to the request from the application control section 113, the connection state control section 115 transmits an INVITE message to the network application server 100 through the message transmission/reception section 116 (step T3).

The network application server 100 discriminates the pertaining number conversion application based on a connection source address and a connection destination address of the received INVITE message and downloads the number conversion application to the first terminal equipment 110 (step T4).

In the first terminal equipment 110, the application control section 113 starts up the downloaded application and accesses the number conversion table stored in the database 140 using the database accessing type API (step T5) to acquire a transfer destination number from the database 140 (step T6).

Then, the application control section 113 sets a trigger to the state variation detection section 114 using the state collection type API so that, when an event that a connection is cut occurs, a notification of it may be issued to the application control section 113 (step T7).

Since this event is one of events which are detected by the connection state control section 115, the state variation detection section 114 sets it to the connection state control section 115 that, when an event of "transition to a state wherein a connection is cut" occurs, the connection state control section 115 should notify the state variation detection section 114 of the occurrence of the event (step T8).

Then, the application control section 113 transmits a request for connection to the transfer destination address acquired in step T6 to the connection state control section 115 using the connection destination control type API in accordance with the number conversion application (step T9).

When the connection state control section 115 receives the connection request, it transmits an INVITE message to the second terminal equipment 120 of the transfer destination (step T10).

When the second terminal equipment 120 receives the connection request from the first terminal equipment 110, it transmits an OK message back to the first terminal equipment 110 (step T11), and both of the first terminal equipment 110 and the second terminal equipment 120 enter a connection state (step T12). Consequently, communication between the first terminal equipment 110 and the second terminal equipment 120 is enabled.

If the second terminal equipment 120 determines to cut the connection, then it issues a BYE message to the connection state control section 115 of the first terminal equipment 110 (step T13).

When the connection state control section 115 of the first terminal equipment 110 receives the cut of the connection, it transmits an OK message back to the second terminal equipment 120 (step T14).

Consequently, since the event of the "transition to a state wherein a connection is cut" designated in step T8 has occurred, the connection state control section 115 issues a notification of occurrence of the event to the state variation detection section 114 (step T15).

The state variation detection section 114 fires the trigger set in step T7 using the state collection type API and issues a notification of this to the application control section 113 (step T16).

The application control section 113 registers connect time to the transfer destination into the database 140 using the database accessing type API (step T17).

In the second embodiment described above, the first terminal equipment 110 writes connect time into the database 140. However, it is otherwise possible to connect the message transmission/reception section 126 of the second terminal equipment 120 to the database 140 so that writing of connect time into the database 140 is performed by the second terminal equipment 120 as described below as a modification to the second embodiment of the present invention.

Figure 5:
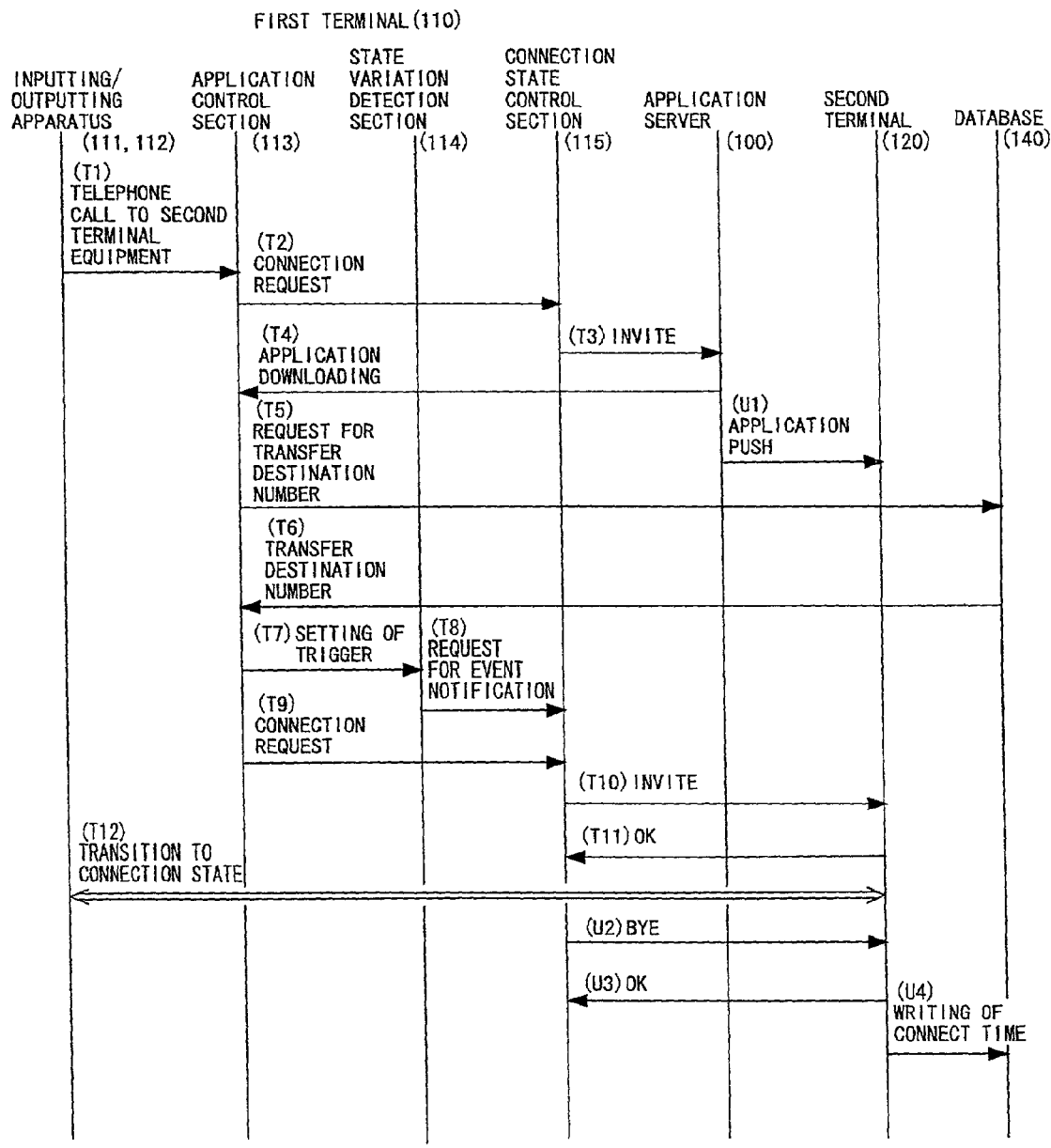
FIG. 5 is a flow chart illustrating operation of a modification to the network application decentralized execution system of FIG. 3.

FIG. 5 illustrates operation of the network application decentralized execution system according to the modification to the second embodiment.

Though not shown in the accompanying drawings, in the network application decentralized execution system according to the modification to the second embodiment, the database 140 is connected to the message transmission/reception section 126 of the second terminal equipment 120 while it is not connected to the message transmission/reception section 116 of the first terminal equipment 110, different from the second embodiment.

The network application decentralized execution system performs processing in steps T1 to T12 of FIG. 5 quite similar to that in steps T1 to T12 of FIG. 4 described hereinabove. Thus, overlapping description of the common processing is omitted herein to avoid redundancy.

The operation of the network application decentralized execution system of the modification to the second embodiment is different from the operation of the second embodiment described above in that, after the network application server 100 receives an INVITE message from the first terminal equipment 110 in step T3, the application is pushed also to the second terminal equipment 120 (step U1).

After the first terminal equipment 110 determines that the connection should be cut, the connection state control section 115 of the first terminal equipment 110 issues a BYE message to the second terminal equipment 120 (step U2).

When the second terminal equipment 120 receives the cut of the connection, it transmits an OK message back to the connection state control section 115 of the first terminal equipment 110 (step U3).

The application downloaded to the second terminal equipment 120 in step U1 writes connect time into the database 140 using transition of the connection state to a cut state as a trigger (step U4).

While, in the modification to the second embodiment, the database 140 is connected only to the message transmission/reception section 126 of the second terminal equipment 120 but is not connected to the message transmission/reception section 116, it is otherwise possible to connect the database 140 to both of the message transmission/reception section 126 of the second terminal equipment 120 and the message transmission/reception section 116 of the first terminal equipment 110 so that both of the first terminal equipment 110 and the second terminal equipment 120 can write connect time into the database 140.

In the following, a network application decentralized execution system according to a second modification to the second embodiment described above is described.

In the present modification, a prepaid application is used as an example of a network application. The prepaid application allows communication for a period of time corresponding to an amount of money paid in advance by a source of connection or a destination of connection. The remaining connectable time is stored in the database.

In the second modification described below, a terminal equipment of the destination of connection accesses the database to acquire connectable time of the source of connection and notifies, before the remaining time is used up, the source of connection that the remaining time is little. If the connectable time decreases to zero, then the terminal equipment of the destination of connection cuts the connection. Further, the terminal equipment of the destination of connection writes time of the connection into the database after the connection is cut.

Figure 6:
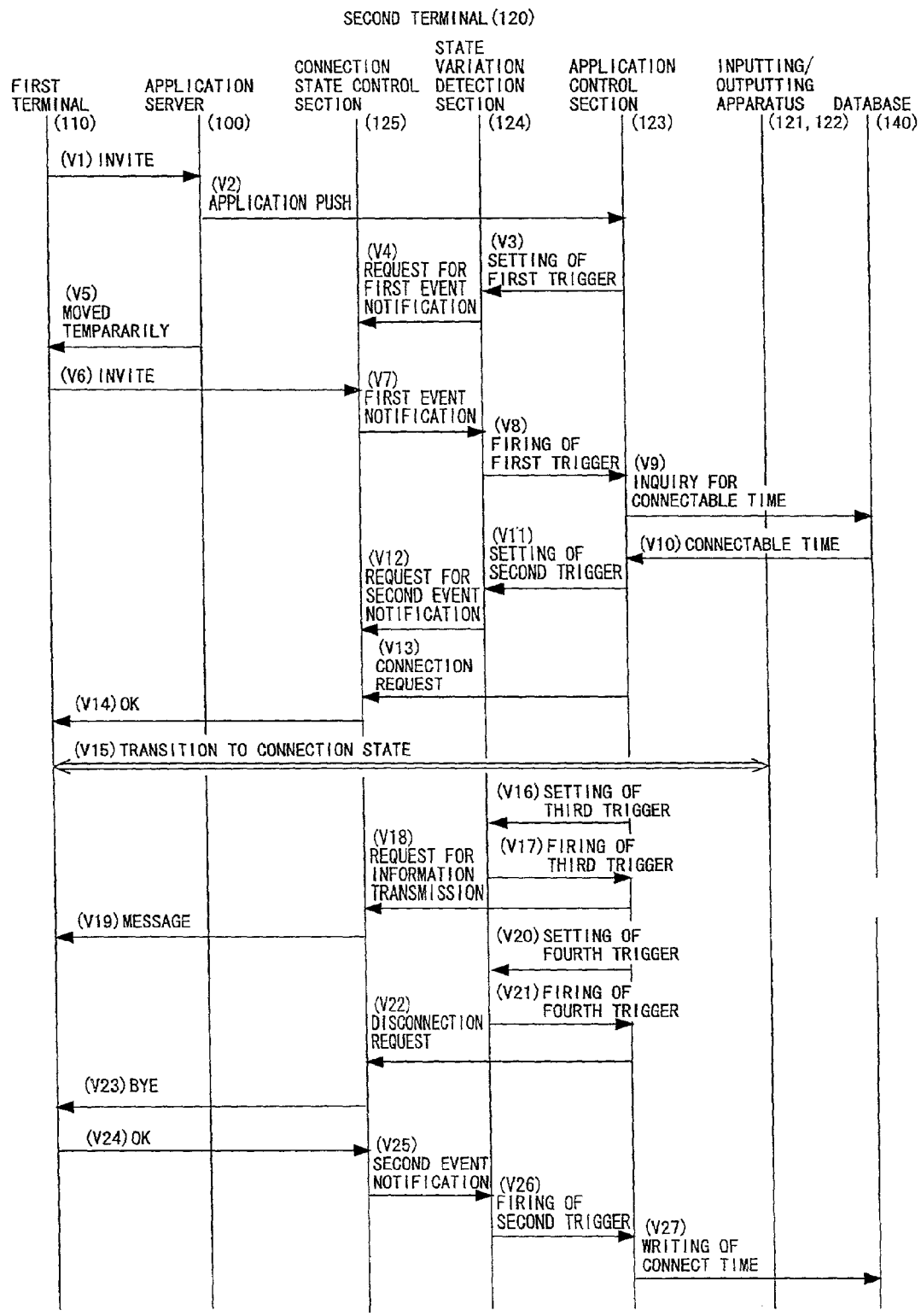
FIG. 6 is a flow chart illustrating operation of another modification to the network application decentralized execution system of FIG. 3.

FIG. 6 illustrates operation of the network application decentralized execution system according to the second modification to the second embodiment.

The network application decentralized execution system of the present modification has a structure same as the network application decentralized execution system of the first modification to the second embodiment described above. It is to be noted that the database 140 in the present embodiment has connectable time stored in advance therein for each terminal equipment and further records service time after a connection is cut.

In the following, operation of the network application decentralized execution system of the present modification is described with reference to FIG. 6.

It is assumed that, in the present modification, the network application server 100 is registered as a redirect server of the SIP (a server which issues a notification of a transfer destination to a terminal equipment of a source of connection) in the first terminal equipment 110.

The first terminal equipment 110 issues an INVITE message in order to establish a connection to the second terminal equipment 120. Since the network application server 100 is registered as a proxy server in the first terminal equipment 110, the INVITE message comes to the network application server 100 (step V1).

The network application server 100 discriminates the pertaining prepaid application based on a connection source address and a connection destination address of the received INVITE message, and pushes the prepaid application to the application control section 123 of the second terminal equipment 120 (step V2).

The application control section 123 sets a first trigger to the application storage section 127 using the state collection type API so that the state variation detection section 124 may issue a notification when it receives a connection request from the first terminal equipment 110 (step V3).

Since this event that "a connection request is received from the first terminal equipment 110" is an event which is detected by the connection state control section 125, the state variation detection section 124 sets it to the connection state control section 125 that the connection state control section 125 should issue a first event notification (step V4).

The network application server 100 transmits, after it pushes the prepaid application to the second terminal equipment 120 in step V2, to the first terminal equipment 110, a message (Moved Temporarily) for notification of a connection destination address of the second terminal equipment 120 which is a transfer destination (step V5).

Then, the first terminal equipment 110 transmits a connection request message (INVITE) to the second terminal equipment 120 (step V6).

When the second terminal equipment 120 receives the connection request message (INVITE), the connection state control section 125 thereof issues a first event notification to the state variation detection section 124 (step V7).

When the state variation detection section 124 receives the first event notification, it fires the first trigger using the state collection type API and issues to the application control section 123 a notification that the first trigger has been fired (step V8).

Then, the application control section 123 issues an inquiry for connectable time to the database 140 based on the address of the first terminal equipment 110 included in the INVITE message received from the first terminal equipment 110 (step V9). The database accessing type API is used for the inquiry.

The database 140 transmits connectable time obtained by a search to the second terminal equipment 120 (step V10).

Thereafter, the application control section 123 of the second terminal equipment 120 sets it to the state variation detection section 124 that, when a connection is cut, a second trigger for notification of the cutting of a connection should be sent to the application control section 123 (step V11).

Since the event that a connection is cut is an event detected by the connection state control section 125, the state variation detection section 124 performs necessary setting to the connection state control section 125 so that, when this event occurs, an event notification for notification of the occurrence of the event may be sent from the connection state control section 125 to the state variation detection section 124 (step V12).

Thereafter, the application control section 123 issues a request for connection to the connection state control section 125 using the connection destination control type API in order to establish a connection to the first terminal equipment 110 (step V13).

When the connection state control section 125 receives the connection request, it transmits an OK message to the first terminal equipment 110 through the message transmission/reception section 126 (step V14).

Consequently, the first and second terminal equipments 110 and 120 enter a connection state wherein they can communicate with each other (step V15).

Then, the application control section 123 determines, based on the connectable time acquired from the database 140, a point of time at which, when the remaining time becomes little (for example, 30 seconds), a notification of this should be issued to the first terminal equipment 110, and then sets a third trigger for notifying, when the point of time comes, the application control section 123 of the fact to the state variation detection section 124 (step V16).

When the point of time set in step V16 comes, the third trigger is fired (step V17), and the application control section 123 issues a request to the connection state control section 125 using the user interaction type API to issue a notification that the remaining connectable time is little to the first terminal equipment 110 (step V18).

The connection state control section 125 transmits a MESSAGE message to the first terminal equipment 110 through the message transmission/reception section 126 in response to the request (step V19). In response to the MESSAGE message, the outputting apparatus 112 of the first terminal equipment 110 displays that the remaining connectable time is little.

Further, the application control section 123 sets a fourth trigger to the state variation detection section 124 so that, when the remaining connectable time decreases to zero, a notification of this may be sent from the state variation detection section 124 to the application control section 123 (step V20).

When the remaining connectable time decreases to zero, the fourth trigger is fired (step V21), and the application control section 123 issues a request for cutting of a connection to the connection state control section 125 using the connection destination controlling API (step V22).

In response to the connection cutting request, the connection state control section 125 transmits a BYE message to the first terminal equipment 110 through the message transmission/reception section 126 (step V23).

When the first terminal equipment 110 receives the cut of the connection, an OK message is transmitted from the first terminal equipment 110 back to the second terminal equipment 120 (step V24).

In response to the transition from the connection state to the disconnection state, the second event notification set in step V12 is performed from the connection state control section 125 to the state variation detection section 124 (step V25).

When the state variation detection section 124 receives the second event notification, it fires the second trigger using the state collection type API and issues a notification that the second trigger has been fired to the application control section 123 (step V26).

Then, the application control section 123 records connect time between the first terminal equipment 110 and the transfer destination into the database 140 using the database accessing type API (step V27).

While preferred embodiments of the present invention have been described using specific terms, such description is for illustrative purposes only, and it is to be understood that changes and variations may be made without departing from the spirit or scope of the following claims.

What is claimed is:

1. A network application decentralized execution system, comprising:
a network application server storing an application execution script for a concentrated switched network, the application execution script allowing communication between terminal equipments through an exchange; and
two or more terminal equipments connected to said server and capable of downloading the application execution script from said server,
each said terminal equipment including a connection state variation detection section (114) for detecting a variation of a connection state of said terminal equipment, a connection state control section (115) for controlling the connection state of said terminal equipment in response to the detected connection state, and an application plug-in section (117) for plugging in the application execution script selected and downloaded (S7) from said network application server to the terminal equipment so that the downloaded application execution script is executed between the two terminal equipments without intervention of any exchange, wherein,
said connection state variation detection section and said connection state control section operate in accordance with the downloaded application execution script plugged-into the application plug-in section, and
the state variation detection section supervises a connection event designated by the application execution script and includes each of a connection of a call being completed, the connection of the call coming to an end, a call destination being busy during a call connection attempt, and a geographic position of a connected terminal equipment changing.

2. A network application decentralized execution system as claimed in claim 1, further comprising a database, and wherein said plug-in section, by executing the application execution script selected and downloaded from the network application server, records a telephone connection time between said first and second terminal equipment into said database, the telephone connection time indicating a length of the time said first and second terminal equipment were in a connected state.

3. A network application decentralized execution system which allows application of a network application developed for a concentrated switched network to a decentralized switched network, comprising:
a network application server; and
a first terminal equipment;
a second terminal equipment;
said network application server including
an application storage section (101) for storing application execution scripts for a concentrated switched network server, the stored application execution scripts available for downloading to the first and second terminal equipment,
a subscriber information storage section (102) for storing download information identifying which individual ones of the stored application execution scripts the terminal equipments have downloaded from the network application server, the first terminal equipment being a subscriber identified in the subscriber information storage section as having a first application execution script downloaded from said network application server, the first application execution script being a network application to establish bi-directional communications between the first and second terminal equipment,
a subscriber/application information management section (103) for managing said application storage section and said subscriber information storage section, and
a data transmission/reception section (104) for exchanging data with said first terminal equipment;
said first terminal equipment including
an application storage section (117) for storing the first application execution script downloaded from said network application server,
an application control section (113) for executing the first application execution script stored in said application storage section,
a state variation detection section (114) for supervising an event designated by the first application execution script and issuing, if the event occurs, a notification of the occurrence of the event to said application control section in order to establish the bi-directional communication between the first and second terminal equipment without intervention of any exchange,
a call state storage section (118) for storing a call state of said first terminal equipment and for storing a call state of the second terminal equipment when the first terminal equipment is engaging in establishing the bi-directional communication with the second terminal equipment,
a connection state control section (115) for managing said call state storage section, and
a data transmission/reception section (116) for exchanging data with the terminal equipment of the other party and said network application server,
the first application execution script downloaded from said network application server, being an application execution script for allowing communication between terminal equipments through an exchange in a concentrated switched network.

4. A network application decentralized execution system as claimed in claim 3, wherein said application control section includes and uses an application programming interface for a concentrated switched network to control said call state storage section and said connection state control section.

5. A network application decentralized execution system as claimed in claim 4, wherein said application control section has, as a function of the application programming interface, a function of detecting an event concerning a change in a communication connection status of said second terminal equipment and issuing a notification of the occurrence of the event to the first application execution script.

6. A network application decentralized execution system as claimed in claim 4, wherein said application control section has, as a function of the application programming interface, a function of causing the application execution script to place said first terminal equipment into a connection state and a communication state with said second terminal equipment.

7. A network application decentralized execution system as claimed in claim 4, wherein said application control section has, as a function of the application programming interface, a function of causing the first application execution script to control the connection state of said first terminal equipment.

8. A network application decentralized execution system as claimed in claim 4, wherein said application control section has, as a function of the application programming interface, a function of causing the first application execution script to interact with a user through said first terminal equipment.

9. A network application decentralized execution system as claimed in claim 4, wherein said application control section has, as a function of the application programming interface, a function of causing the first application execution script to access said network application server.

10. A network application decentralized execution system as claimed in claim 4, wherein said application control section has, as a function of the application programming interface, a function of causing the first application execution script to call a process of a concentrated server.

11. A network application decentralized execution system as claimed in claim 4, wherein said application control section has, as a function of the application programming interface, a function of ending an execution state of the first application execution script.

12. A network application as claimed in claim 3, further comprising:
a database connected to said first terminal equipment;
said database being connected to said data transmission/reception section of said first terminal equipment.

13. A network application decentralized execution system as claimed in claim 12, wherein said application control section includes and uses an application programming interface for a concentrated switched network to control said call state storage section and said connection state control section.

14. A network application decentralized execution system as claimed in claim 13, wherein said application control section has, as a function of the application programming interface, a function of detecting an event and issuing a notification of the occurrence of the event to the first application execution script.

15. A network application decentralized execution system as claimed in claim 13, wherein said application control section has, as a function of the application programming interface, a function of causing the first application execution script to place said first terminal equipment into a connection state and a communication state.

16. A network application decentralized execution system as claimed in claim 13, wherein said application control section has, as a function of the application programming interface, a function of causing the first application execution script to control the connection state of said first terminal equipment.

17. A network application decentralized execution system as claimed in claim 13, wherein said application control section has, as a function of the application programming interface, a function of causing the first application execution script to interact with a user through said first terminal equipment.

18. A network application decentralized execution system as claimed in claim 13, wherein said application control section has, as a function of the application programming interface, a function of causing the first application execution script to access said network application server.

19. A network application decentralized execution system as claimed in claim 13, wherein said application control section has, as a function of the application programming interface, a function of causing the first application execution script to call a process of a concentrated server.

20. A network application decentralized execution system as claimed in claim 12, wherein said application control section writes into said database, by executing the first application execution script, a period of time to record a connection time between said first and second terminal equipment into said database, the connection time indicating a length of the time said first and second terminal equipment were in a connected communication state.

21. A terminal equipment which cooperates with a network application server to form a network application decentralized execution system which allows application of a network application developed for a concentrated switched network to a decentralized switched network, comprising:
connection state variation detection means for detecting a variation of a connection state of said terminal equipment with another terminal equipment including detecting a busy condition of the another terminal equipment while originating a telephone call to the another terminal equipment;
connection state control means for controlling the connection state of said terminal equipment with the another terminal equipment, including re-originating the telephone call automatically using a trigger that the busy condition of the another terminal equipment has come to an end; and
plug-in means for plugging in an application execution script downloaded from said network application server, the application execution script being a network application to establish bi-directional communications between said terminal equipment and the another terminal equipment.

22. A terminal equipment which cooperates with a network application server to form a network application decentralized execution system which allows application of a network application developed for a concentrated switched network to a decentralized switched network, comprising:
an application storage section for storing the application execution script downloaded from said network application server;
an application control section for executing the application execution script stored in said application storage section;
a state variation detection section for supervising an event designated by the application execution script and issuing, if the event occurs, a notification of the occurrence of the event to said application control section in order to establish bi-directional communication between the terminal equipment and another terminal equipment;
a call state storage section for storing a call state of said terminal equipment and the another terminal equipment when the terminal equipment is engaged in establishing the communication between with the another terminal equipment;
a connection state control section for managing said call state storage section; and
a data transmission/reception section for exchanging data with the terminal equipment of the other party and said network application server.

23. A terminal equipment as claimed in claim 22, wherein said application control section includes and uses an application programming interface for a concentrated switched network to control said call state storage section and said connection state control section.

24. A terminal equipment as claimed in claim 23, wherein the application programming interface has a function of detecting an event and issuing a notification of the occurrence of the event to the application execution script.

25. A terminal equipment as claimed in claim 23, wherein the application programming interface has a function of causing the application execution script to place said terminal equipment into a connection state and a communication state.

26. A terminal equipment as claimed in claim 23, wherein the application programming interface has a function of causing the application execution script to control the connection state of said terminal equipment.

27. A terminal equipment as claimed in claim 23, wherein the application programming interface has a function of causing the application execution script to interact with a user through said terminal equipment.

28. A terminal equipment as claimed in claim 23, wherein the application programming interface has a function of causing the application execution script to access said network application server.

29. A terminal equipment as claimed in claim 23, wherein the application programming interface has a function of causing the application execution script to call a process of a concentrated server.

30. A terminal equipment as claimed in claim 23, wherein the application programming interface has a function of ending an execution state of the application execution script.

31. A terminal equipment which cooperates with a network application server and a database to form a network application decentralized execution system which allows application of a network application developed for a concentrated switched network to a decentralized switched network, comprising:
  an application storage section for storing the application execution script downloaded from said network application server;
  an application control section for executing application execution script and managing said application storage section;
  a state variation detection section for supervising an event designated by the application execution script and issuing, if the event occurs, a notification of the occurrence of the event to said application control section in order to establish communications between the terminal equipment and another terminal equipment;
  a call state storage section for storing a call state of said terminal equipment and the another terminal equipment of the communication;
  a connection state control section for managing said call state storage section; and
  a data transmission/reception section connected to said database for exchanging data with the terminal equipment of the other party and said network application server,
  the application execution script being a network application to establish bi-directional communications between the terminal equipment and the another terminal equipment.

32. A terminal equipment as claimed in 31, wherein said application control section includes and uses an application programming interface for a concentrated switched network to control said call state storage section and said connection state control section.

33. A terminal equipment as claimed in claim 31, wherein the application programming interface has a function of detecting an event and issuing a notification of the occurrence of the event to the application execution script.

34. A terminal equipment as claimed in claim 31, wherein the application programming interface has a function of causing the application execution script to place said terminal equipment into a connection state and a communication state.

35. A terminal equipment as claimed in claim 31, wherein the application programming interface has a function of causing the application execution script to control the connection state of said terminal equipment.

36. A terminal equipment as claimed in claim 31, wherein the application programming interface has a function of causing the application execution script to interact with a user through said terminal equipment.

37. A terminal equipment as claimed in claim 31, wherein the application programming interface has a function of causing the application execution script to access said network application server.

38. A terminal equipment as claimed in claim 31, wherein the application programming interface has a function of causing the application execution script to call a process of a concentrated server.

39. A terminal equipment as claimed in claim 31, wherein the application programming interface has a function of ending an execution state of the application execution script.

40. A terminal equipment as claimed in claim 31, wherein said application control section writes a period of time within which the application execution script is executed into said database.

41. An execution method of a network application for a network application decentralized execution system which includes a network application server and a terminal equipment and allows application of a network application developed for a concentrated switched network to a decentralized switched network, comprising:
  a first step of detecting a variation of a connection state between said network application server and said terminal equipment;
  a second step of controlling the connection state in response to the variation detected by the first step; and
  a third step of for plugging in an application execution script downloaded from said network application server, the application execution script providing for monitoring a time period of communication connection between said terminal equipment and another terminal equipment.

42. An execution method of a network application as claimed in claim 41, further comprising a step of recording time for which the application execution script is executed.

43. An execution method of a network application for a network application decentralized execution system which includes a network application server and a terminal equipment and allows application of a network application developed for a concentrated switched network to a decentralized switched network, comprising:
  a first step of downloading the network application from said network application server into said terminal equipment;
  a second step of setting a first trigger for starting up the network application, downloaded from said network application server to said terminal equipment, to said terminal equipment, the first trigger being a change in a monitored communication connection status at another terminal equipment that said terminal equipment is seeking to establish communications with;

a third step of starting up the network application when the first trigger is fired; and a fourth step of ending the execution of the network application when a particular operation is performed.

44. An execution method of a network application as claimed in claim 43, further comprising a step of setting a second trigger for starting up a next operation when the first trigger is fired.

45. An execution method of a network application as claimed in claim 43, further comprising a step of setting an N+1th trigger for starting up a next operation when an Nth trigger is fired, N being a positive integer greater than 1.

46. An execution method of a network application as claimed in claim 43, wherein the first step includes the steps of:

using, when power supply to said terminal equipment is switched on, the switching on of the power supply as a trigger to start up a network application for allowing selection from among services which can be used by said terminal equipment;

transmitting subscriber identification information from said terminal equipment to said network application server;

preparing a list of network applications which can be used by a user of said terminal equipment based on the subscriber identification information by said network application server and transmitting the list from said network application server to said terminal equipment;

selecting one of the network applications from within the list by the user of said terminal equipment; and downloading the selected network application from said network application server to said terminal equipment, said selected network application providing an automatic call-back function from said terminal equipment to the another terminal equipment upon receiving a notification from the another terminal equipment of the changing a communication state from a busy state to a not-busy state.

47. An execution method of a network application as claimed in claim 43, further comprising a step of storing the network application downloaded from said network application server into said terminal equipment.

48. An execution method of a network application as claimed in claim 43, further comprising a step of issuing, when the first trigger is fired, before the network application is started up, an inquiry from said terminal equipment to a user of said terminal equipment regarding whether or not the network application may be started up.

49. An execution method of a network application as claimed in claim 44, further comprising a step of issuing, when the first trigger is fired, before the network application is started up, an inquiry from said terminal equipment to a user of said terminal equipment regarding whether or not the network application may be started up, and wherein the second trigger is set only when the user consents to starting up of the network application.

50. An execution method of a network application as claimed in claim 45, further comprising a step of issuing, when the first trigger is fired, before the network application is started up, an inquiry from said terminal equipment to a user of said terminal equipment regarding whether or not the network application may be started up, and wherein the second to N+1th triggers are set only when the user consents to starting up of the network application.

51. An execution method of a network application as claimed in claim 43, further comprising a step of recording time for which the network application is executed.

52. An operation method for a terminal equipment which cooperates with a network application server to form a network application decentralized execution system which allows application of a network application developed for a concentrated switched network to a decentralized switched network, comprising:

a first step of detecting a variation of a connection state between said terminal equipment and said network application server;

a second step of controlling the connection state in response to the variation detected by the first step; and a third step of plugging in an application execution script downloaded from said network application server, the application execution script providing for monitoring a time period of communication connection between said terminal equipment and another terminal equipment.

53. An operation method for a terminal equipment as claimed in claim 52, further comprising a step of recording time for which the application execution script is executed.

54. An operation method for a terminal equipment which cooperates with a network application server to form a network application decentralized execution system which allows application of a network application developed for a concentrated switched network to a decentralized switched network, comprising:

a first step of downloading the network application from said network application server into said terminal equipment;

a second step of setting a first trigger for starting up the network application, downloaded to said terminal equipment from said network application server, to said terminal equipment, the first trigger being a change in a monitored communication connection status at another terminal equipment that said terminal equipment is seeking to establish communications with;

a third step of starting up the network application when the first trigger is fired; and a fourth step of ending the execution of the network application when a desired operation is performed.

55. An operation method for a terminal equipment as claimed in claim 54, further comprising a step of setting a second trigger for starting up a next operation when the first trigger is fired.

56. An operation method for a terminal equipment as claimed in claim 54, further comprising a step of setting an N+1th trigger for starting up a next operation when an Nth trigger is fired, N being a positive integer greater than 1.

57. An operation method for a terminal equipment as claimed in claim 54, wherein the first step includes the steps executed by said terminal equipment of:

using, when power supply to said terminal equipment is switched on, the switching on of the power supply as a trigger to start up a network application for allowing selection from among services which can be used by said terminal equipment;

transmitting subscriber identification information to said network application server;

receiving a list of network applications which can be used by a user of said terminal equipment prepared based on the subscriber identification information by and transmitted from said network application server; and downloading one of the network applications of the list selected by a user of said terminal equipment from said network application server.

58. An operation method for a terminal equipment as claimed in claim 54, further comprising a step of storing the network application downloaded from said network application server into said terminal equipment.

59. An operation method for a terminal equipment as claimed in claim 54, further comprising a step of issuing, when the first trigger is fired, before the network application is started up, an inquiry to a user of said terminal equipment regarding whether or not the network application may be started up.

60. An operation method for a terminal equipment as claimed in claim 55, further comprising a step of issuing, when the first trigger is fired, before the network application is started up, an inquiry from said terminal equipment to a user of said terminal equipment regarding whether or not the network application may be started up, and wherein the second trigger is set only when the user consents to starting up of the network application.

61. An operation method for a terminal equipment as claimed in claim 56, further comprising a step of issuing, when the first trigger is fired, before the network application is started up, an inquiry from said terminal equipment to a user of said terminal equipment regarding whether or not the network application may be started up, and wherein the second to N+1th triggers are set only when the user consents to starting up of the network application.

62. An operation method for a terminal equipment as claimed in claim 54, further comprising a step of recording time for which the network application is executed.

63. A network application decentralized execution system, comprising:

an application server located on a public network;

first and second terminal equipment connected to the application server, the first terminal equipment being a telephone call calling party, the second terminal equipment being a called party of the telephone call; and network telephone applications hosted on the application server and available for download to the first and second terminal equipment, a first of the telephone network applications being an automatic call back service application that, when downloaded from the application server and installed in the first terminal equipment, provides a service re-originating a telephone call from the calling party to the called party after an original telephone call to the called party results in receiving, at the calling party, a busy notification from the called party signifying the called party is involved in another telephone conversation, the automatic call back service application being automatically started using a trigger activated in response to the calling party receiving, from the called party, an end-of-call notification that the another telephone conversion of the called party has ended, the first terminal equipment comprising i) a plug-in means for plugging in the automatic call back service application after selection and downloaded by the first terminal equipment from said application server, ii) connection state variation detection means for detecting a variation of a connection state of the called party based on receipt of the end-of-call notification, and iii) connection state control means for controlling the connection state of the calling party with the called party, the connection state control means being activated by the automatic call back service application responding to the trigger.

64. A network application decentralized execution system which allows application of a network application developed for a concentrated switched network to a decentralized switched network, comprising:

a network application server hosting plural available telephone application execution scripts for downloading to terminal equipment; and a first terminal equipment comprising i) an inputting apparatus (110) operable by a user of the first terminal equipment to select, for downloading (S6), a telephone application execution script from a list, provided by the network application server to the first terminal equipment, of the plural available telephone application scripts, ii) plug-in means for plugging in the application execution script selected and downloaded (S7) from said network application server, iii) connection state variation detection means (114) for detecting a variation of a telephone connection state of a second terminal equipment based on a response message sent from the second terminal equipment to the first terminal equipment, the response message being sent responsive to an initial message from the first terminal equipment to the second terminal equipment, and iv) connection state control means (115) for controlling the connection state of said first terminal equipment with the second terminal equipment based on the response message sent from the second terminal equipment to the first terminal equipment.

* * * * *